US010837941B2

(12) United States Patent
Kamiya

(10) Patent No.: US 10,837,941 B2
(45) Date of Patent: Nov. 17, 2020

(54) ELECTRONIC CONTROL UNIT

(71) Applicant: DENSO CORPORATION, Kariya (JP)

(72) Inventor: Yuto Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 16/040,921

(22) Filed: Jul. 20, 2018

(65) Prior Publication Data

US 2019/0049406 A1 Feb. 14, 2019

(30) Foreign Application Priority Data

Aug. 10, 2017 (JP) ................................. 2017-155489

(51) Int. Cl.
| | | |
|---|---|---|
| *G01N 27/417* | (2006.01) | |
| *F02D 41/14* | (2006.01) | |
| *F02D 41/24* | (2006.01) | |
| *F02N 11/08* | (2006.01) | |
| *F02D 41/04* | (2006.01) | |
| *F02D 41/26* | (2006.01) | |

(52) U.S. Cl.
CPC ..... *G01N 27/4175* (2013.01); *F02D 41/1439* (2013.01); *F02D 41/1494* (2013.01); *F02D 41/1495* (2013.01); *F02D 41/2454* (2013.01); *F02D 41/042* (2013.01); *F02D 41/1454* (2013.01); *F02D 41/266* (2013.01); *F02N 11/0814* (2013.01)

(58) Field of Classification Search
CPC ............ G01N 27/4175; F02D 41/1494; F02D 41/1495; F02D 41/1439; F02D 41/2454; F02D 41/042; F02D 41/266; F02D 41/1454; F02N 11/0814
See application file for complete search history.

(56) References Cited

U.S. PATENT DOCUMENTS

| | | | | |
|---|---|---|---|---|
| 6,467,954 | B2* | 10/2002 | Honda ............... | G01N 27/4067 374/142 |
| 7,043,957 | B2* | 5/2006 | Hattori ............... | G01N 27/4175 73/1.06 |
| 7,180,596 | B2* | 2/2007 | Haraguchi ........... | G01N 27/419 356/437 |
| 7,305,299 | B2* | 12/2007 | Yasui .................. | F02D 41/1454 374/E7.042 |
| 7,393,441 | B2* | 7/2008 | Tashiro .............. | G01N 27/4065 204/406 |
| 9,354,191 | B2* | 5/2016 | Kawaguchi ............ | G01N 27/04 |
| 9,528,458 | B2* | 12/2016 | Date .................... | F02N 11/0814 |
| 9,714,913 | B2* | 7/2017 | Nishijima .......... | G01N 27/4067 |

(Continued)

*Primary Examiner* — Freddie Kirkland, III
(74) *Attorney, Agent, or Firm* — Posz Law Group, PLC

(57) ABSTRACT

An electronic control unit controls an air-fuel ratio sensor to detect an air-fuel ratio in an exhaust gas from an internal-combustion engine. An A/D converter and a sample value processor obtain a signal based on an impedance of the air-fuel ratio sensor in response to a power supply to the air-fuel ratio sensor via filters. A microcomputer determines an environment temperature of the air-fuel ratio sensor based on the signal. A switch or the microcomputer switches between an upstream side voltage supply path and a downstream side voltage supply path to obtain a signal depending on whether the air-fuel ratio sensor is operating in a low-temperature environment to improve the accuracy of the obtained signal.

11 Claims, 12 Drawing Sheets

(56) References Cited

U.S. PATENT DOCUMENTS

| | | | |
|---|---|---|---|
| 9,869,656 B2 * | 1/2018 | Uemura | G01N 27/4065 |
| 10,323,596 B2 * | 6/2019 | Miyamoto | F01M 13/022 |
| 10,451,586 B2 * | 10/2019 | Higuchi | G01N 27/4175 |
| 2001/0000956 A1 * | 5/2001 | Honda | G01N 27/4067 |
| | | | 338/34 |
| 2004/0099041 A1 | 5/2004 | Hattori | |
| 2005/0000810 A1 | 1/2005 | Tashiro et al. | |
| 2008/0109147 A1 | 5/2008 | Tashiro et al. | |
| 2008/0109148 A1 | 5/2008 | Tashiro et al. | |
| 2017/0342927 A1 * | 11/2017 | Miyamoto | F01M 13/00 |

* cited by examiner

ELECTRONIC CONTROL UNIT

CROSS REFERENCE TO RELATED APPLICATION

The present application is based on and claims the benefit of priority of Japanese Patent Application No. 2017-155489, filed on Aug. 10, 2017, the disclosure of which is incorporated herein by reference.

TECHNICAL FIELD

The present disclosure generally relates to an electronic control unit.

BACKGROUND INFORMATION

Conventionally, an air-fuel ratio sensor is used to detect an excess air amount in the exhaust gas from the internal-combustion engine. An electronic control unit for controlling such an air-fuel ratio sensor applies an alternating voltage generated by changing a preset sweep voltage by an amount of $\Delta V$, and calculates an impedance of the air-fuel ratio sensor as a value $\Delta V/\Delta I$. The impedance and temperature in the air-fuel sensor are correlated to each other, and thereby the sensor temperature may be calculable based on a calculation of the impedance. That is, for example, by controlling the temperature of the air-fuel ratio sensor with a heater, the air-fuel ratio sensor may be brought to have an activation temperature.

Japanese Patent No. 2004-177178 discloses a technique that applies a voltage to an oxygen sensor to calculate the impedance of an element. The voltage application influence remaining in the sensor output after calculating the impedance of the oxygen sensor is diminished at an early timing by an application of a reverse voltage to the oxygen sensor and by sampling the sensor output at every sampling interval until it is determined that another element impedance calculation period has lapsed.

During an engine idle or stop state, i.e., when an engine is turned to OFF, if the temperature of the air-fuel ratio sensor is lowered, the vehicle fuel mileage may be improved. Thus, it may be desirable to accurately detect the impedance of the air-fuel ratio sensor in a low-temperature environment, to improve the temperature measurement accuracy.

For example, to remove signal noise, that is, an unwanted frequency component on a signal to the electronic control unit during an engine operation time, the power supply path of the air-fuel ratio sensor may be configured to serve as a filter circuit. Thus, under the influence of the filter circuit, the time constant of the filter circuit may change and the impedance detection accuracy based on the detected signal may deteriorate, especially in a low-temperature environment where impedance tends to be detected as a higher value. Thus, a method of how to accurately detect and obtain the impedance of the air-fuel ratio sensor in such environment is desirable.

SUMMARY

It is an object of the present disclosure to provide an electronic control unit that is capable of improving an accuracy of an obtained signal, which may otherwise easily deteriorate due to an influence of a filter circuit in a low-temperature environment.

In an aspect of the present disclosure, an air-fuel ratio sensor control device for controlling an air-fuel ratio sensor that detects an air-fuel ratio of an exhaust gas from an internal-combustion engine is disclosed. The electronic control unit may include a microcontroller and an air-fuel ratio control integrated circuit (IC). That is, an electronic control unit serving as such a control device may include a signal obtainer configured to obtain a signal from a power supply path on either an upstream side or a downstream side of the air-fuel ratio sensor according to an impedance of an air-fuel ratio sensor in response to the power supplied to the air-fuel ratio sensor. The microcomputer determines whether the air-fuel ratio sensor is currently operating in, or will imminently operate in, a low-temperature environment. Then, based on the determination of whether the air-fuel ratio is operating/will operate in a low-temperature environment, a switcher is configured to switch between the upstream side power supply path and the downstream side of the power supply path to switch the signal obtained by the signal obtainer.

In other words, even when a lower accuracy signal is obtained in the low-temperature environment and influenced by a filter, the switcher can select the signal obtained by the signal obtainer when the microcomputer determines that the air-fuel ratio sensor is either currently in a low-temperature environment, or will imminently be put into a low-temperature environment. As such, the signal can be selected based on the temperature of the environment to improve the accuracy of the obtained signal.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
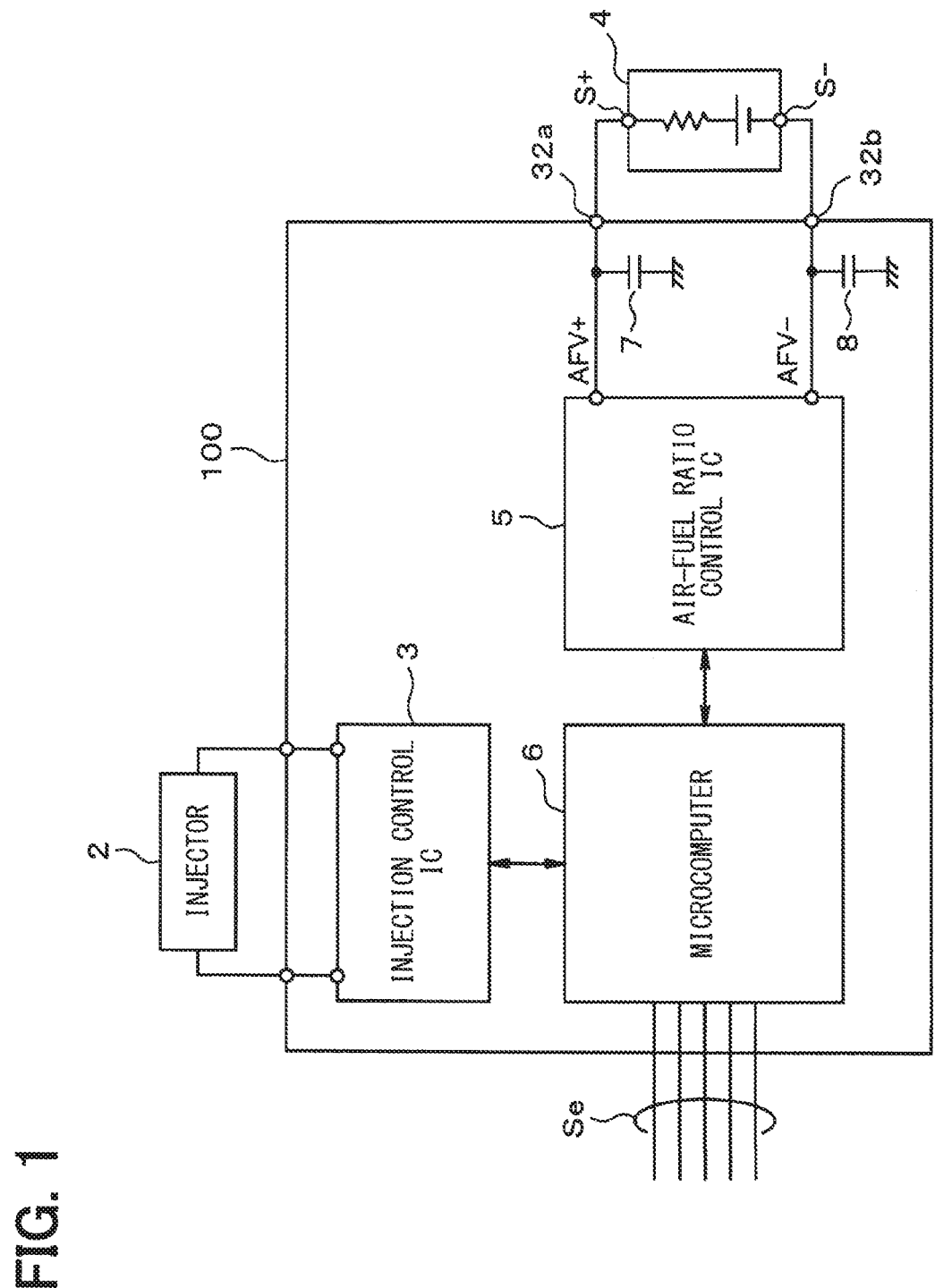
FIG. 1 is a block diagram of an electronic control unit in a first embodiment of the present disclosure.

Hereafter, with reference to the drawings, embodiments of an electronic control unit are described. In the following embodiments, the same reference numerals are assigned to like elements and features of the different embodiments.

First Embodiment

FIGS. 1 to 12 illustrate the first embodiment of the present disclosure. FIG. 1 shows a block diagram of an electronic control unit (ECU) 100 used as an engine ECU. The electronic control unit 100 may be disposed in a vehicle together with various others ECUs and be connected to the various other ECUs via a network. The interconnected ECUs may cooperatively control vehicular devices.

The electronic control unit 100 shown in FIG. 1 may include an injection control integrated circuit (IC) 3, an air-fuel ratio control integrated circuit (IC) 5, and a microcomputer 6 as its main components. The injection control IC 3 performs a fuel injection control of an injector 2 that is used in an engine of the vehicle. The air-fuel ratio control IC 5 performs various control processes for an air-fuel ratio sensor 4 that detects an air-fuel ratio, e.g., an oxygen density in an engine exhaust gas. The microcomputer 6 is connected to the injection control IC 3 and the air-fuel ratio control IC 5.

Capacitors 7 and 8 are respectively disposed on a pair of voltage-application control lines between the air-fuel ratio control IC 5 and the air-fuel ratio sensor 4. These capacitors 7 and 8 are provided in order to remove a harmonic noise from an application voltage applied to the air-fuel ratio sensor 4. Though not illustrated, the microcomputer 6 may include a CPU and a memory, and be configured to execute a program stored in the memory, that is, a non-transitive, substantive recording medium.

The internal-combustion engine may include a crank angle sensor (not illustrated), which outputs a crank angle signal at a preset angle of rotation of an engine crank. The microcomputer 6 is configured to receive the crank angle signal output by the crank angle sensor. An electronic throttle sensor for detecting an opening of an electronic throttle and a temperature sensor for detecting the temperature of various media (e.g., cooling water, suction air) are installed in the vehicle, for example, and the electronic control unit 100 is configured to receive a sensor signal Se input from various sensors, e.g., for performing a control process based on the sensor signal Se. Various sensor signals Se are input to the microcomputer 6 through an input circuit (not illustrated).

Figure 2:
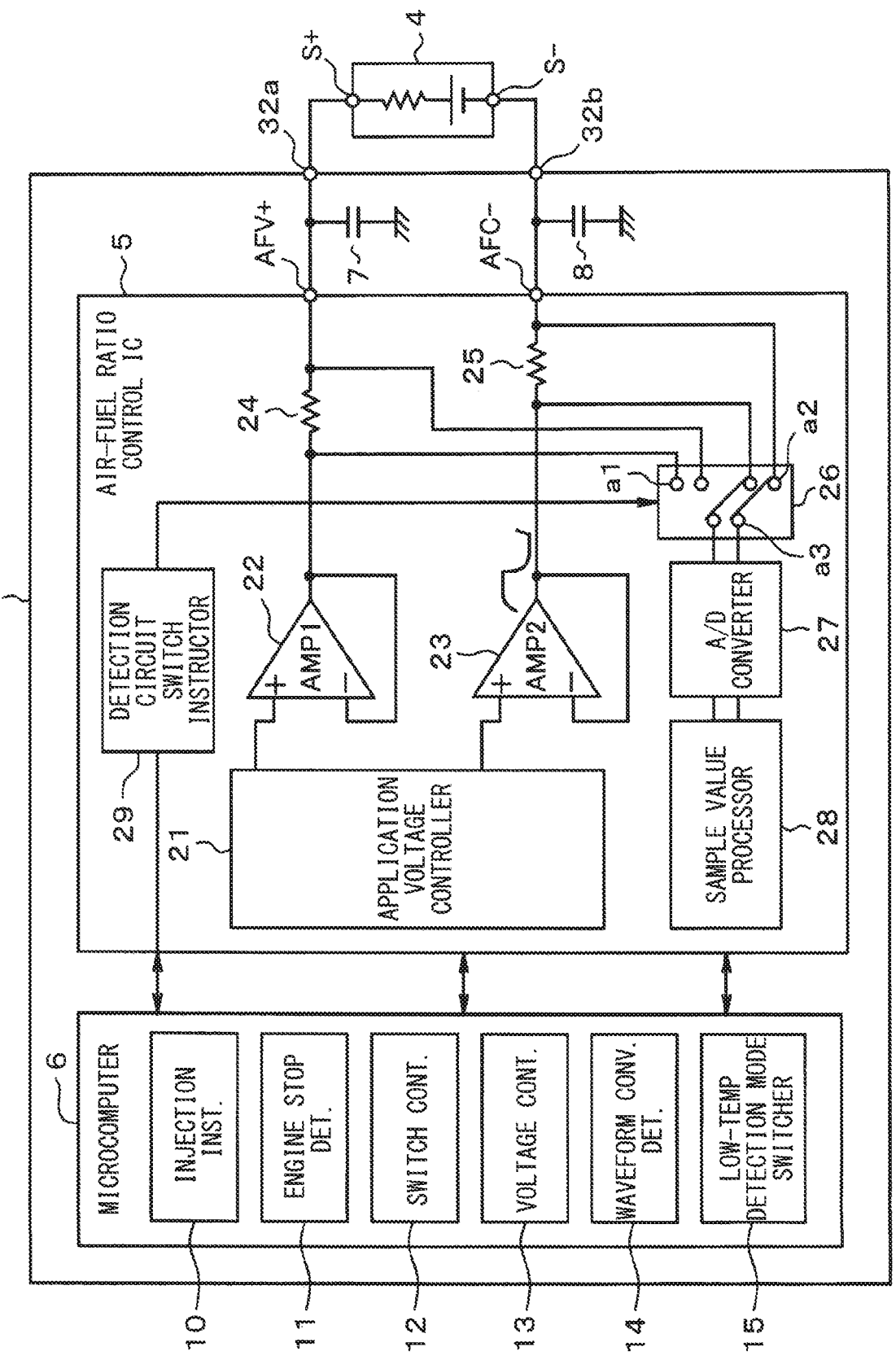
FIG. 2 is a block diagram of a microcomputer and an air-fuel ratio control IC.

With reference to FIG. 2, the microcomputer 6 may include an injection instructor 10, an engine stop determiner 11, a switch controller 12, a voltage controller 13, a wave convergence determiner 14, and a low-temperature detection mode switcher 15. Each of the injection instructor 10, the engine stop determiner 11, the switch controller 12, the voltage controller 13, the wave convergence determiner 14, and the low-temperature detection mode switcher 15 may be realized by software, that is, as functions performed by the microcomputer 6 executing a program stored in memory. Alternatively, each of the injection instructor 10, the engine stop determiner 11, the switch controller 12, the voltage controller 13, the wave convergence determiner 14, and the low-temperature detection mode switcher 15 may be realized by hardware. That is, the injection instructor 10, the engine stop determiner 11, the switch controller 12, the voltage controller 13, the wave convergence determiner 14, and the low-temperature detection mode switcher 15 may be specific circuits for performing their respective functions. For example, the injection instructor 10, the engine stop determiner 11, the switch controller 12, the voltage controller 13, the wave convergence determiner 14, and the low-temperature detection mode switcher 15 may be application-specific integrated circuits (ASICs), Field-programmable gate arrays (FPGAs), and like hardware circuits, and configured to perform the function respective to each element. The functions and processes performed by the elements of microcomputer 6 are described below in greater detail.

The injection instructor 10 performs an injection instruction by outputting an injection signal to the injection control IC 3 for injecting fuel from the injector 2.

The switch controller 12 is configured to control a switch 26 via a detection circuit switch instructor 29 of the air-fuel ratio control IC 5. Details of the switch 26 and the detection circuit switch instructor 29 are described below in greater detail.

The voltage controller 13 is configured to apply an alternating sweep voltage $\Delta V$ to the air-fuel ratio sensor 4 via an application voltage controller 21 in the air-fuel ratio control IC 5.

The wave convergence determiner 14 is configured to determine whether a waveform of the signal has converged when the wave convergence determiner 14 receives an input signal from the air-fuel ratio control IC 5. The details of the waveform convergence determination function are described below in greater detail.

The low-temperature detection mode switcher 15 is configured to perform a switching function to switch between a normal mode and a low-temperature detection mode based on a detected temperature.

The air-fuel ratio control IC 5 of the electronic control unit 100 may include the application voltage controller 21, buffer amplifiers 22 and 23, a protection resistor 24 that acts as a detection resistor for overcurrent protection, a shunt resistor 25 that acts as a detection resistor for current detection, the switch 26, an A/D converter 27, a sample value processor 28, and the detection circuit switch instructor 29. The A/D converter 27 and the sample value processor 28 may operate together as a "signal obtainer" to obtain a signal. The air-fuel ratio control IC 5 and the microcomputer 6 act together as a feedback control loop for controlling the application voltage to the air-fuel ratio sensor 4, and the air-fuel ratio control IC 5 performs a control process for controlling the air-fuel ratio sensor 4.

Figure 3A:
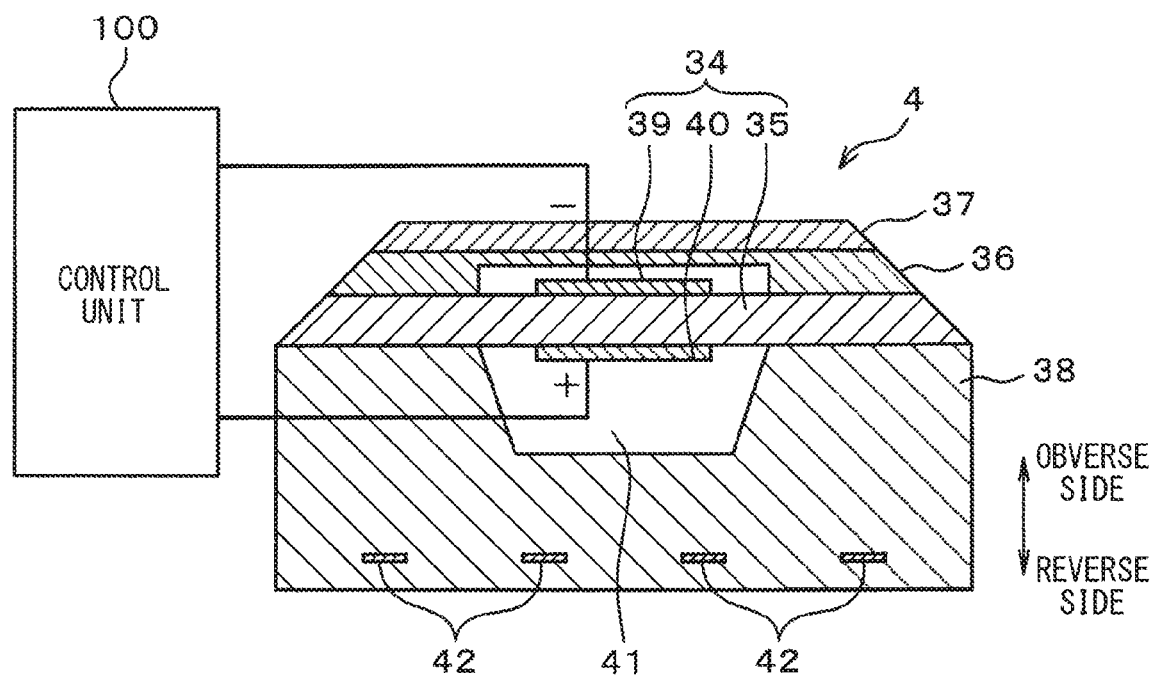
FIG. 3A illustrates a vertical cross-sectional view of an air-fuel ratio sensor.

With reference to FIG. 3A, the microcomputer 6 is electrically connected to a heater 42 via a heater controller (not illustrated). With reference again to FIG. 2, a positive terminal S+ of the air-fuel ratio sensor 4 is connected to a positive terminal 32a of the electronic control unit 100, and a negative terminal S− of the air-fuel ratio sensor 4 is connected to a negative terminal 32b of the electronic control unit 100.

As shown in FIG. 3A, the air-fuel ratio sensor 4 is provided with a sensor cell 34, which substantively detects a state of a gas contained in the exhaust gas of the internal-combustion engine. The air-fuel ratio sensor 4 of the present embodiment has a solid electrolyte layer 35, a diffusion resistance layer 36, a shielding layer 37, and an insulation layer 38, which are layered from top to bottom in FIG. 3A as one-cell type sensor. The solid electrolyte layer 35 is implemented, for example, as a rectangular plate-like sheet.

The sensor cell 34 of the air-fuel ratio sensor 4 is structured as two electrodes 39 and 40 opposing each other with the solid electrolyte layer 35 sandwiched between the electrodes 39 and 40.

The diffusion resistance layer 36 is provided as a porous sheet for introducing the exhaust gas to the electrode 39, and the shielding layer 37 is provided as a dense layer for controlling the penetration of the exhaust gas. The insulation layer 38 is provided as a high heat-conductivity ceramic. An air duct 41 is bored in a part of the insulation layer 38 that opposes the electrode 40. The heater 42 is embedded in the insulation layer 38. The electric current flowing in a sensor element of the sensor cell 34 in the air-fuel ratio sensor 4 increases/decreases proportionately with the air-fuel ratio. That is, the current flowing in the sensor element of the sensor cell 34 may increase or decrease depending on whether the air-fuel ratio is rich or lean. More specifically, the lean air-fuel ratio increases the electric current in the sensor element, and the rich air-fuel ratio decreases the electric current in the sensor element.

Figure 3B:
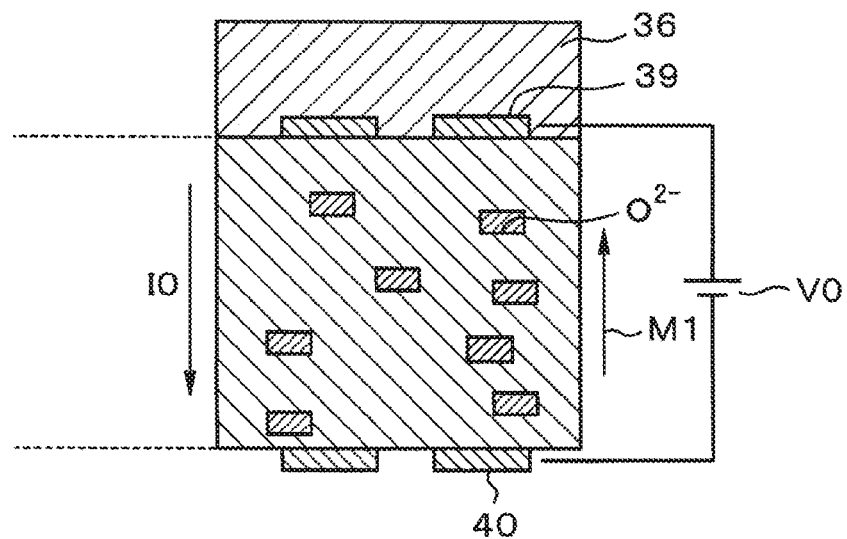
FIG. 3B illustrates a conduction principle between electrodes on the air-fuel ratio sensor.
Figure 4:
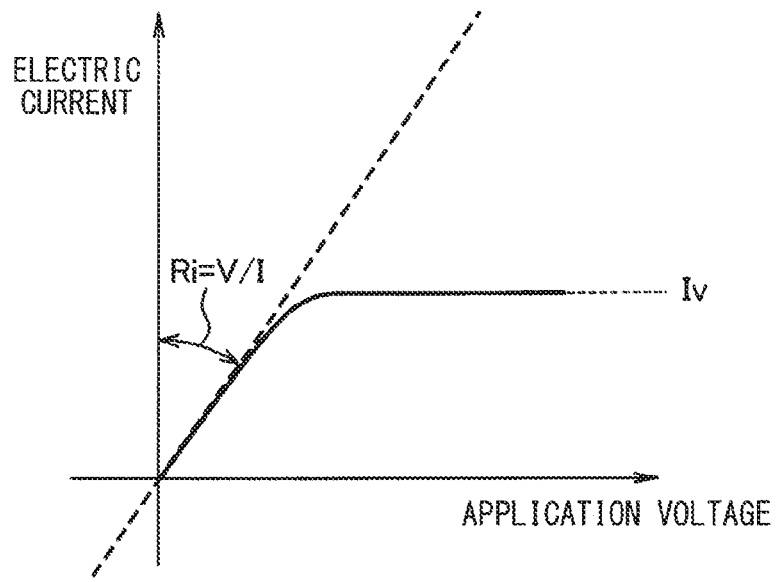
FIG. 4 illustrates characteristics of the air-fuel ratio sensor.

With reference to FIGS. 2 and 3B, a current I0 flows between terminals S+ and S− by biasing the sensor cell 34, which causes a reverse flow of an oxygen ion O2− that moves opposite to the direction of the current I0 flow. As shown in FIG. 3B, the flow direction of the oxygen ion O2− is represented by an arrow Ml. The diffusion resistance layer 36 acts to resist the flow of the oxygen ion O2−. As shown in FIG. 4, a relationship between a sensor application voltage and a sensor current causes a limit current region Iv for the sensor current to vary based on the air-fuel ratio. With reference again to FIG. 2, the microcomputer 6 determines the air-fuel ratio by detecting the limit current region Iv, and controls the air-fuel ratio to have a requested ratio, e.g., a stoichiometric ratio (e.g., 14.5). The microcomputer 6 outputs an instruction signal to the application voltage controller 21 via the voltage controller 13, and adjusts the voltage applied to the positive terminal S+ and the negative terminal S− by the application voltage controller 21. In such manner, the air-fuel ratio sensor 4, the air-fuel ratio control IC 5, and the microcomputer 6 work together to perform application voltage feedback control.

With continued reference to FIG. 2, the internal configuration of the air-fuel ratio control IC 5 of the electronic control unit 100 is further described. The application voltage controller 21 of the air-fuel ratio control IC 5 may include a D/A converter, an RC filter, and like circuitry components (not illustrated). The application voltage controller 21 is configured to receive an instruction signal from the microcomputer 6, to output a bias voltage to the buffer amplifier 22, and to bias the positive terminal S+ of the air-fuel ratio sensor 4 with a voltage via the buffer amplifier 22, the protection resistor 24, and the positive terminal 32a on an upstream side. Similarly, in response to the instruction signal from the microcomputer 6, the application voltage controller 21 is further configured to output a voltage to the buffer amplifier 23, and to output a voltage to the negative terminal S− of the air-fuel ratio sensor 4 through the buffer amplifier 23, the shunt resistor 25, and the negative terminal 32b on a downstream side.

Normally, when the microcomputer 6 provides a control instruction to the air-fuel ratio control IC 5, the microcomputer 6 refers to a map stored in the memory to determine a direct current value based on the sensor current signal corresponding to each of the air-fuel ratio values. The microcomputer then generates and transmits the control instruction to the air-fuel ratio control IC 5, for an output of the determined direct current value from the application voltage controller 21 to the positive terminal S+ through the buffer amplifier 22.

Figure 8:
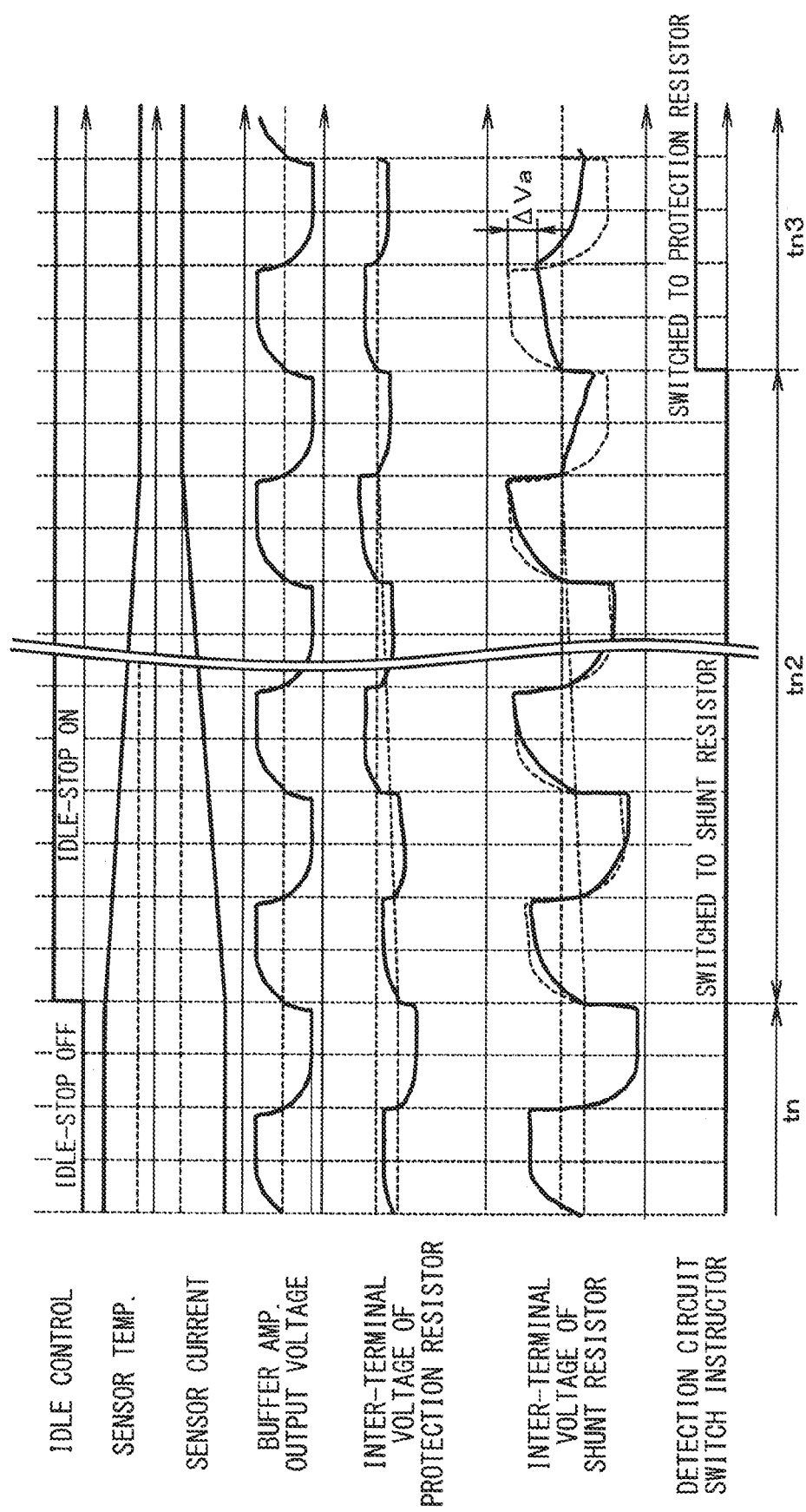
FIG. 8 is a graph of an inter-terminal voltage of a detection resistor based on a change in sensor temperature.

The application voltage controller 21 controls the buffer amplifier 23 to output a sweep voltage as an application voltage to the air-fuel ratio sensor 4. The sweep voltage may be centered on a predetermined voltage (e.g., 2.5 V) with a preset range (e.g., ±0.2). The application voltage controller 21 controls the buffer amplifier 23 to output a voltage, which has a substantially rectangular waveform (e.g., fin-shaped waveform) with a high frequency component cut therefrom, as shown in FIGS. 2 and 8, by using, for example, a D/A converter and a filter. In such manner, an alternating sweep voltage $\Delta V$ can be continuously applied to the air-fuel ratio sensor 4.

The switch 26 is a selective input type switch provided with fixed terminals a1 and a2 and a movable terminal a3. Control of the switch 26 is enabled by the switch controller 12 of the microcomputer 6 via the detection circuit switch instructor 29 of the air-fuel ratio control IC 5.

One fixed terminal a1 of the switch 26 receives an input of an inter-terminal voltage of the protection resistor 24 on the upstream side, and the other fixed terminal a2 of the switch 26 receives an input of an inter-terminal voltage of the shunt resistor 25 on the downstream side. As such, the switch 26 can be controlled to switch an output from the movable terminal a3 to the A/D converter 27, from among the inter-terminal voltage of the protection resistor 24 on the upstream side, and the inter-terminal voltage of the shunt resistor 25 on the downstream side.

The A/D converter 27 performs an analog-to-digital conversion process of the input voltage at a predetermined sampling cycle (e.g., 5 microseconds), and outputs a digital value to the sample value processor 28. That is, the A/D converter 27 can sample the inter-terminal voltage of the protection resistor 24 or the inter-terminal voltage of the shunt resistor 25 with a predetermined sampling cycle (e.g., 5 microseconds), and can obtain a value corresponding to the supply current of the air-fuel ratio sensor 4.

The sample value processor 28 obtains a "noise-filtered" moving average of the sample values, which is derived by calculating an average of the output from the A/D converter 27 for a preset period (i.e., an average of consecutive sample values for a preset period), and outputs the noise-filtered moving average values to the microcomputer 6, while also outputting sample values sampled as they are to the microcomputer 6 at the above-described sampling cycle (e.g., 5 microseconds).

The microcomputer 6 of the electronic control unit 100 is configured to calculate a sensor impedance Zac. That is, the above-described application voltage function of the application voltage controller 21 enables a continuous output of the alternating sweep voltage $\Delta V$. The microcomputer 6 detects a current change $\Delta I$ based on the sweep voltage $\Delta V$ by using the sample value processor 28, to calculate the impedance Zac by dividing the sweep voltage by the detection result (e.g., $\Delta V/\Delta I$).

By calculating the impedance Zac of the air-fuel ratio sensor 4, the microcomputer 6 may be used to estimate and/or calculate an environment temperature of the air-fuel ratio sensor 4 given a correspondence between the impedance Zac and the environment temperature. That is, the microcomputer 6 may calculate an environment temperature of the air-fuel ratio sensor 4 based on a signal obtained by the signal obtainer (i.e., the A/D converter 27 and the sample value processor 28). In such manner, the microcomputer 6 acts as a low temperature determiner to determine when the air-fuel ratio sensor 4 is currently in a low temperature environment or will imminently be put into a low temperature environment based on the detected impedance Zac (e.g., the signal from the signal obtainer). As described herein, a "low temperature environment" may be an environment where temperatures are 500° C. or lower.

Figure 5:
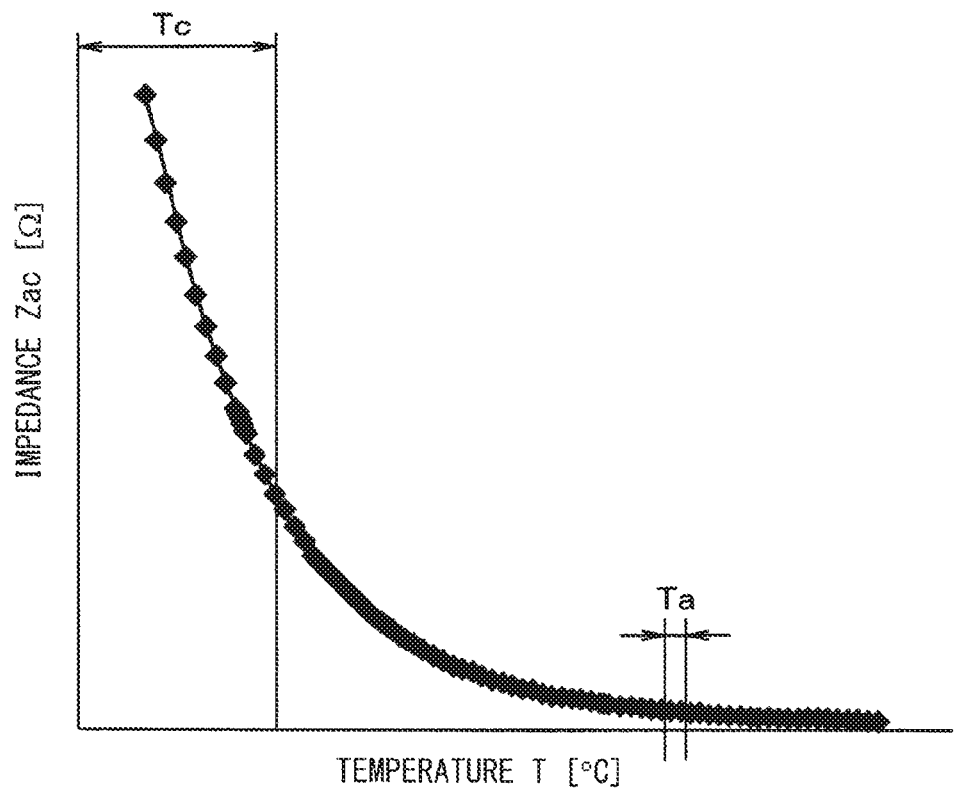
FIG. 5 illustrates characteristics of the air-fuel ratio sensor.

FIG. 5 shows temperature-dependent characteristics of the impedance Zac of the air-fuel ratio sensor 4, which depends on temperature T. As shown in FIG. 5, temperature T and the impedance Zac have an inversely-proportional relationship. Therefore, when temperature T rises, the impedance Zac falls, and when temperature T falls, the impedance Zac rises.

In the normal mode, the microcomputer 6 performs a feedback control of the power supply to the heater 42 to control the sensor impedance Zac to have a predetermined value based on the calculation result of the impedance Zac, thereby adjusting temperature T of the air-fuel ratio sensor 4 to be within a predetermined activation temperature range Ta. In the low-temperature impedance detection mode, the microcomputer 6 adjusts temperature T to a "low-temperature" control range Tc.

The relationship between the activation temperature range Ta of the air-fuel ratio sensor 4 in the normal mode and the temperature control range Tc in the low-temperature impedance detection mode is illustrated in FIG. 5. As shown in FIG. 5, the activation temperature range Ta in which the air-fuel ratio sensor 4 in the normal mode is activated is a substantially-high temperature of several hundred degrees (° C.), which is very high compared to a normal temperature (e.g., 25° C.) and the temperature control range Tc in the low-temperature impedance detection mode.

The details of the control method of how to calculate the sensor impedance Zac of the air-fuel ratio sensor 4 and how to control temperature T by power supply control of the heater 42 according to the impedance Zac are described with reference to FIG. 6.

Figure 6:
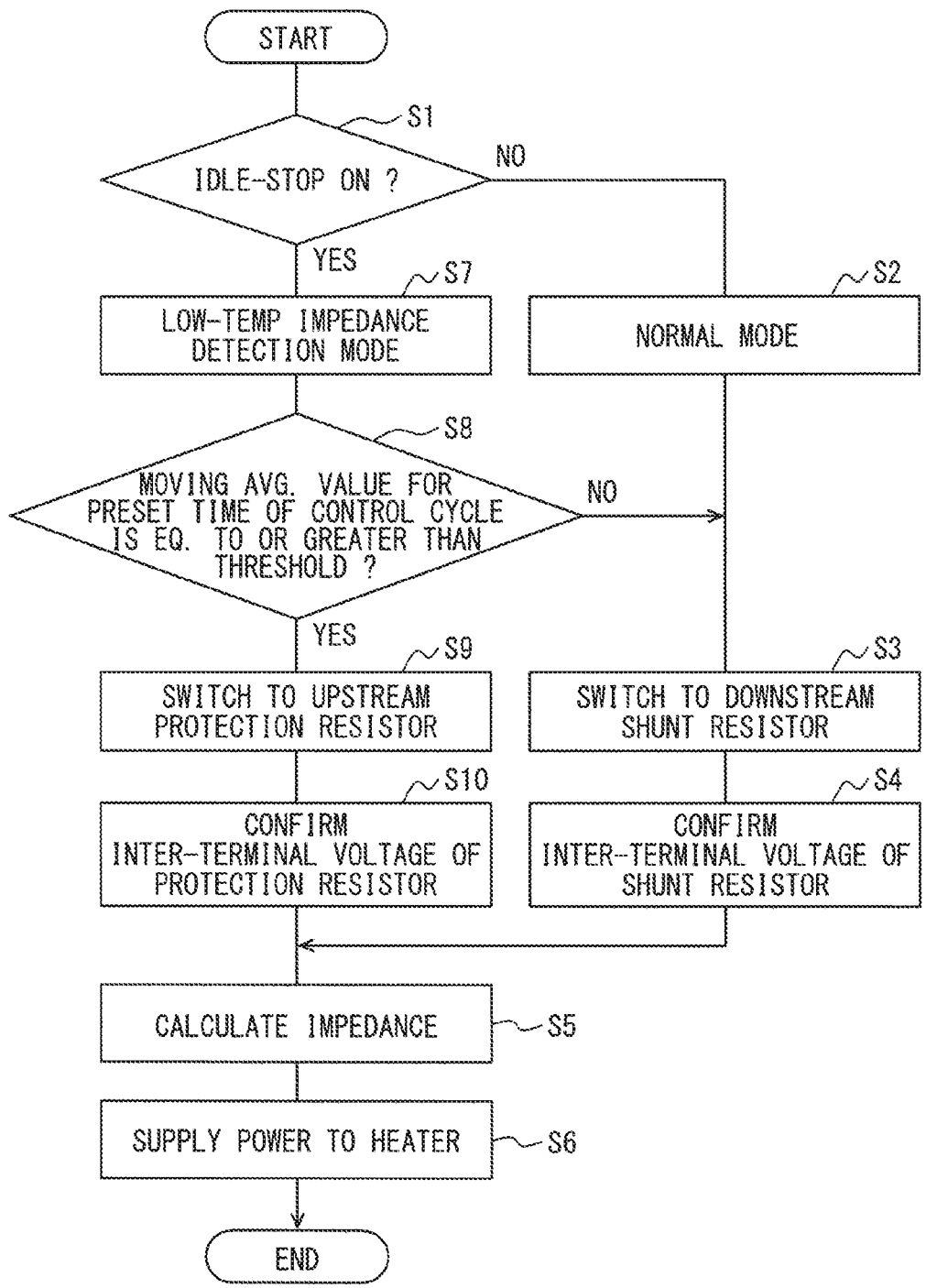
FIG. 6 is a flowchart of a control operation.

FIG. 6 illustrates a main operation performed by the electronic control unit 100. When an internal-combustion engine is started, the microcomputer 6 of the electronic control unit 100 receives an input of various sensor signals Se, and instructs the injection control IC 3 to perform a fuel injection control for injecting fuel from the injector 2 based on the sensor signals Se. When the microcomputer 6 controls the injection control IC 3 to perform a fuel injection control, the microcomputer 6 outputs an injection signal to the injection control IC 3 by using the injection instructor 10. The injection control IC 3 injects fuel from the injector 2, when it receives the injection signal. Also, the microcomputer 6 outputs a voltage control instruction to the air-fuel ratio control IC 5 by using the voltage controller 13.

The air-fuel ratio control IC 5, upon receiving the voltage control instruction from the voltage controller 13 of the microcomputer 6, outputs the alternating sweep voltage ΔV using the application voltage controller 21, and applies the sweep voltage ΔV to the air-fuel ratio sensor 4. The microcomputer 6 calculates the impedance Zac upon receiving an input of the inter-terminal voltage from the shunt resistor 25, or of the protection resistor 24, via the sample value processor 28.

In the present embodiment, the microcomputer 6 of the electronic control unit 100 changes how to obtain the current change ΔI, depending on whether an idle-stop ON state is set or in effect, by using the method of obtaining the inter-terminal voltage of the resistor as referred to in Steps S1 to S4 and S7 to S10 in FIG. 6. The microcomputer 6 determines whether the idle-stop ON state is set by using the engine stop determiner 11, which may be determined based on (a) a condition that any injection signal from the injection instructor 10 to the injection control IC 3 has not been output for a preset amount of time, or (b) a condition of various sensor signals Se, that is, whether any sensor signal from the crank angle sensor has not been output for a preset amount of time.

That is, when the microcomputer 6 is not outputting the injection signal to the injection control IC 3 for a preset period of time or more, it is determinable that the idle-stop ON state is set, and, when the crank angle sensor has not been detecting any sensor signal for a preset period of time or more, it is determinable that the idle-stop ON state is set.

When it is determined by the microcomputer 6 that the condition of the idle-stop ON state is not fulfilled, i.e. NO at S1, the microcomputer 6 determines that an internal-combustion engine is started and performing an injection control, and the microcomputer 6 sets the normal mode to keep the temperature of the air-fuel ratio sensor 4 to be within the activation temperature range Ta (e.g., several hundred degrees) in S2. At S3, the switch controller 12 of the microcomputer 6 via the detection circuit switch instructor 29 provides switching instructions to the switch 26 to switch to the shunt resistor 25 on the downstream side. In S4, the application voltage controller 21 is used to apply the alternating sweep voltage ΔV, and obtains, that is, confirms, the inter-terminal voltage of the shunt resistor 25.

More specifically, when calculating the impedance Zac according to the output of the sample value processor 28, the microcomputer 6 may for example obtain a maximum sample value corresponding to the current change ΔI, at a backmost part of preset control cycle (e.g., 100 [μs]). Here, in the present embodiment, the sample value processor 28 outputs a sample value as is, without any processing such as averaging or the like. However, the sample value processor 28 may output the maximum sample value at a backmost part of the preset control cycle by performing a filter process, and the microcomputer 6 may obtain a processed value after such processing. When the microcomputer 6 obtains the maximum sample value, a sensitivity to the current change ΔI may be maximized.

At S5, the microcomputer 6 calculates the impedance Zac by calculating the current change ΔI based on the inter-terminal voltage of the shunt resistor 25. At S6, the microcomputer 6 performs a power supply control to the heater 42 based on the calculated impedance Zac. In such manner, the control of the sensor temperature in the normal mode can be appropriately performed.

When it is determined by the microcomputer 6 that the condition of the idle-stop ON state is fulfilled, i.e. "YES" at S1, the microcomputer 6 performs a power supply control to stop supplying power to the heater 42 to lower the temperature of the air-fuel ratio sensor 4 from the activation temperature range Ta. In such manner, temperature of the air-fuel ratio sensor 4 falls to eventually be in the temperature control range Tc. At S7, the low-temperature detection mode switcher 15 switches to, i.e., sets, the low-temperature impedance detection mode.

At S8, the microcomputer 6 determines whether a moving average of the impedance Zac within a preset time of a control cycle in the low-temperature impedance detection mode is equal to or greater than a preset threshold. The control cycle here means a cycle of alternating sweep voltage ΔV, and the moving average means a value derived from calculating an average of the inclinations of consecutive sample points for each of the preset time sections. By calculating a moving average, the influence of noise on the signal can be limited and/or prevented. That is, in other words, if the moving average is equal to or greater than the preset threshold for a preset time, e.g., especially during a latter half of the control cycle, this indicates that a time constant in such control cycle is greater than a predetermined value.

When temperature T is within the low-temperature control range Tc, the impedance Zac of the air-fuel ratio sensor 4 rises to a high impedance, which enables the microcomputer 6 to determine that the time constant of the filter circuit has a drastically large value, which leads to a determination of "YES" in S8. The temperature T within the low-temperature control range Tc further leads to a determination by a function of the wave convergence determiner 14 that the waveform has not yet converged. At S8, when the microcomputer 6 determines that the moving average value for the preset time of the control cycle is equal to or greater than a threshold value, i.e., "YES" at S8, the microcomputer 6 and the detection circuit switch instructor 29 perform the switching control to switch the switch 26 to the protection resistor 24 on the upstream side based on an instruction of the detection circuit switch instructor 29 at S9.

At S10, the microcomputer 6 applies the alternating sweep voltage ΔV by using the application voltage controller 21, and then obtains and confirms the inter-terminal voltage of the protection resistor 24. Then, at S5, the microcomputer 6 calculates the impedance Zac by calculating the current change ΔI based on the inter-terminal voltage of the protection resistor 24 (S5). At S6, the microcomputer 6 performs a power supply control of the heater 42 based on the calculated impedance Zac. In such manner, according to the impedance Zac detected/calculated in the low-temperature impedance detection mode, a power supply control to the heater 42 is performed, and a temperature control reducing the temperature of the air-fuel ratio sensor 4 to the low-temperature control range Tc is achieved.

<Discussion of Technical Aspect/Advantage>

Figure 7:
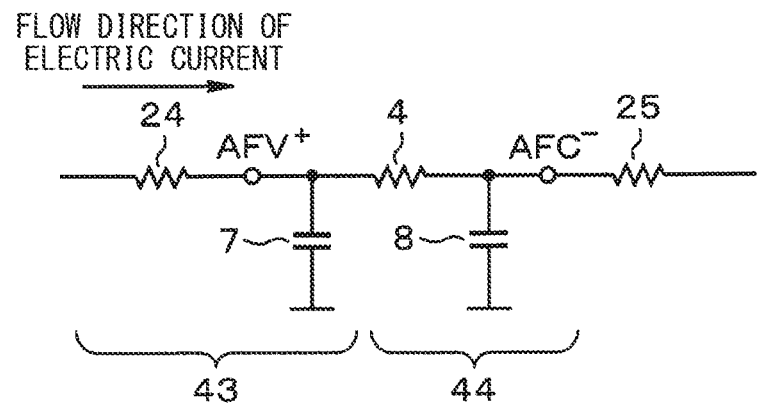
FIG. 7 illustrates an equivalent circuit of the air-fuel ratio sensor and filters.

FIG. 7 illustrates an equivalent circuit proximate to the air-fuel ratio sensor 4, i.e., from the protection resistor 24 to the shunt resistor 25. Normally, the application voltage controller 21 applies the alternating sweep voltage ΔV to the air-fuel ratio sensor 4 shown in FIG. 7 by way of a filter, including for example, a first filter 43 and a second filter 44 that respectively include a part of the air-fuel ratio sensor 4. The first filter 43 and the second filter 44 thus serve as a secondary RC low-pass filter. For example, when stopping the internal-combustion engine, the air-fuel ratio shifts toward lean, that is, a more economic air-fuel ratio to reduce fuel consumption and discharge less toxic substances (i.e., reduce emissions/pollution). In such a lean state, an electric current flows from an upstream side terminal AFV+ to a downstream side terminal AFC−.

In the equivalent circuit of FIG. 7, a time constant of the entire equivalent circuit increases proportionally with the circuit constant component of the first and second filters 43, 44. Based on this proportional increase, a voltage delay is notably generated for the inter-terminal voltage of a capacitor 8, which is part of the latter stage filter 44 from among the two-stage filters 43 and 44.

FIG. 8 illustrates a relationship between the inter-terminal voltage of the protection resistor 24 and the inter-terminal voltage of the shunt resistor 25 in view of the temperature change of the air-fuel ratio sensor 4. In FIG. 8, a comparative example that excludes the influence of the filters 43 and 44 is also shown as a dashed line.

In the normal mode, an idle-stop OFF state is in effect at time t0 of FIG. 8. In the idle-stop OFF state, the injection control IC 3 performs an injection control to inject fuel from the injector 2, and holds the temperature T of the air-fuel ratio sensor 4 in the activation temperature range Ta, that is, at a high temperature of several hundred degrees Celsius.

As a result, since the impedance Zac of the air-fuel ratio sensor 4 lowers, the time constants of the filters 43 and 44 also fall, and the voltage drop caused by the filters 43 and 44 also decreases. Therefore, even when the current change ΔI is calculated by obtaining the inter-terminal voltage of the shunt resistor 25 on the downstream side, the difference from the comparative example where the filters 43 and 44 have no influence, as shown by the dashed line, will not be noticeable. The resistance of the shunt resistor 25 is set as a high value, which enables a wide detection range of the voltage, and as such, the current change ΔI is accurately detectable. Therefore, by switching to the shunt resistor 25, the impedance Zac can be accurately calculated.

When the internal combustion engine shifts to the idle-stop ON state, the injection control IC 3 stops the fuel injection, and the air-fuel ratio changes to a more atmospheric, lean state. In such case, the electric current flowing in the air-fuel ratio sensor 4 increases, and, as shown at time tn2 of FIG. 8, the electric current flowing in the protection resistor 24 and the shunt resistor 25 also increases.

On the other hand, when the fuel economy improvement effect is increased by lowering the temperature T of the air-fuel ratio sensor 4 in the idle-stop ON state, the impedance Zac of the air-fuel ratio sensor 4 rises. When the impedance Zac of the air-fuel ratio sensor 4 rises, due to the influence of the filters 43 and 44, the voltage amplitude of the alternating voltage of the inter-terminal voltage of the shunt resistor 25 noticeably decreases as compared to the comparative example shown by the dashed lines, for example, as illustrated by the amplitude difference ΔVa at time tn3 of FIG. 8.

Figure 9:
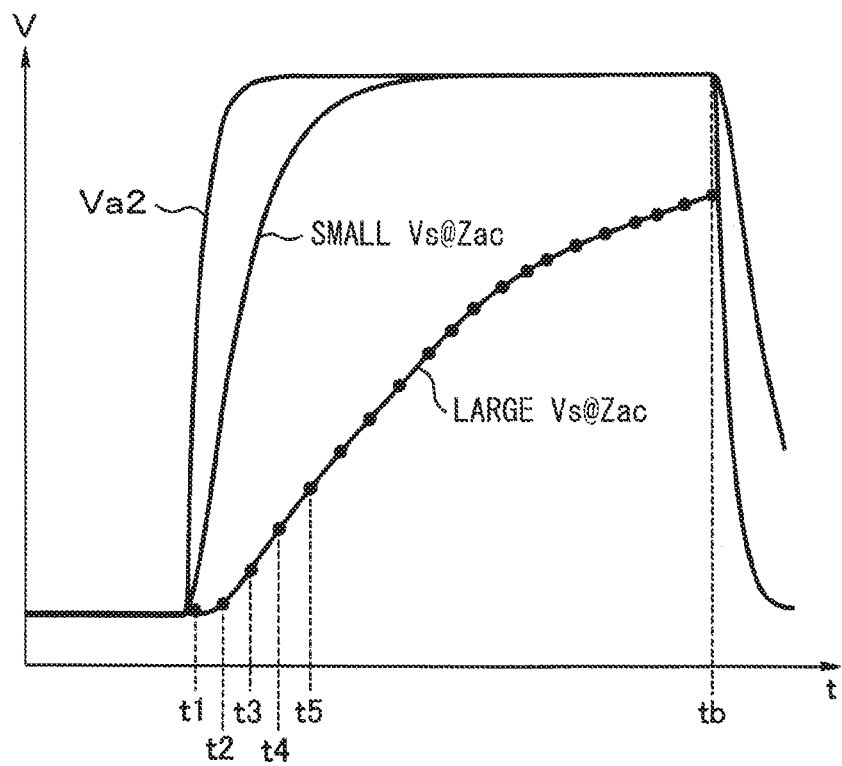
FIG. 9 illustrates characteristics of the inter-terminal voltage in one control cycle.

FIG. 9 shows a voltage characteristics diagram for the change of the inter-terminal voltage in one control cycle. FIG. 9 compares a sweep voltage Va2 output by the buffer amplifier 23, an inter-terminal voltage Vs of the shunt resistor 25 when the impedance Zac is small, and an inter-terminal voltage Vs of the shunt resistor 25 when the impedance Zac is large. When the impedance Zac is large, the degree of the voltage rise (e.g., as shown by the slopes of SMALL Vs@Zac and LARGE Vs@Zac in FIG. 9) is less compared to when the impedance Zac is small.

FIG. 9 illustrates sampling timings t1, t2, t3, t4, t5 . . . tb. These timings represent sampling times when the A/D converter 27 obtains sample voltages by cyclically sampling during one control cycle of the alternating sweep voltage.

As described above, the sample value processor 28 outputs a moving average to the microcomputer 6 by averaging the outputs of the A/D converter 27, and the microcomputer 6 determines whether the condition in S8 of FIG. 6 is fulfilled by using the moving average.

The circuit constant and the control cycle of the resistors 24 and 25 and the capacitors 7 and 8 are specified according to the normal activation temperature, e.g., based on the equivalent circuit of the air-fuel ratio sensor 4 operating on a condition where the impedance Zac is small. When the alternating sweep voltage ΔV is applied to the air-fuel ratio sensor 4, the inter-terminal voltage Vs of the shunt resistor 25 is set with a sufficient amount of settling time, for example, as shown by the "SMALL Vs@Zac" characteristics curve in FIG. 9. Therefore, in the later part of the control cycle of the alternating sweep voltage ΔV, the change of the inter-terminal voltage Vs of the shunt resistor 25 is substantially equal to 0, which: (i) makes the obtained value of Vs sufficiently correspond to, or accurately reflect, the current change ΔI, even when the inter-terminal voltage Vs of the shunt resistor 25 is obtained at only one timing (e.g., at timing tb) before the voltage drop; and (ii) enables an accurate calculation of the impedance Zac.

However, when the impedance Zac is large, the inter-terminal voltage Vs of the shunt resistor 25 cannot be obtained as an accurate value, since a sufficient amount of settling time is not allocated to observe a convergence to the saturation value before the voltage drop at timing tb. As such, the obtained value of the inter-terminal voltage Vs of the shunt resistor 25 does not sufficiently correspond to the current change ΔI. Therefore, in the present embodiment, as shown in Step S8 of FIG. 6, when the moving average during a preset period in a part of the control cycle exceeds a threshold, i.e., "YES" at Step S8, and, when it is determined by the function of the wave convergence determiner 14 that the waveform has not yet converged, the switch 26 is switched to a protection resistor 24 side.

Therefore, even when the inter-terminal voltage Vs of the shunt resistor 25 is still slightly increasing at timing tb of FIG. 9, for example, in the case of LARGE Vs@Zac, with a YES determination at Step S8 of FIG. 6, the microcomputer 6 can obtain the inter-terminal voltage of the protection resistor 24 by switching the switch 26 to the protection resistor 24 on the upstream side by using the detection circuit switch instructor 29.

In such manner, the microcomputer 6 can obtain the inter-terminal voltage of the protection resistor 24 as a voltage corresponding to the current change ΔI, while avoiding an influence of the filter, specifically the latter stage filter 44. As a result, the impedance Zac can be calculated as accurately as possible.

Due to the resistance of the protection resistor 24 adjusted to be smaller than the resistance of the current detection shunt resistor 25, the inter-terminal voltage of the protection resistor 24 becomes lower than the inter-terminal voltage Vs of the shunt resistor 25, as shown in FIG. 8, which also lowers the sensitivity to the voltage. However, avoiding the influence of the filters 43 and 44 greatly contributes to an accurate calculation of the current change ΔI, so that the voltage corresponding to the current change ΔI can be accurately obtained, and as a result, the impedance Zac can be accurately calculated.

Figure 10:
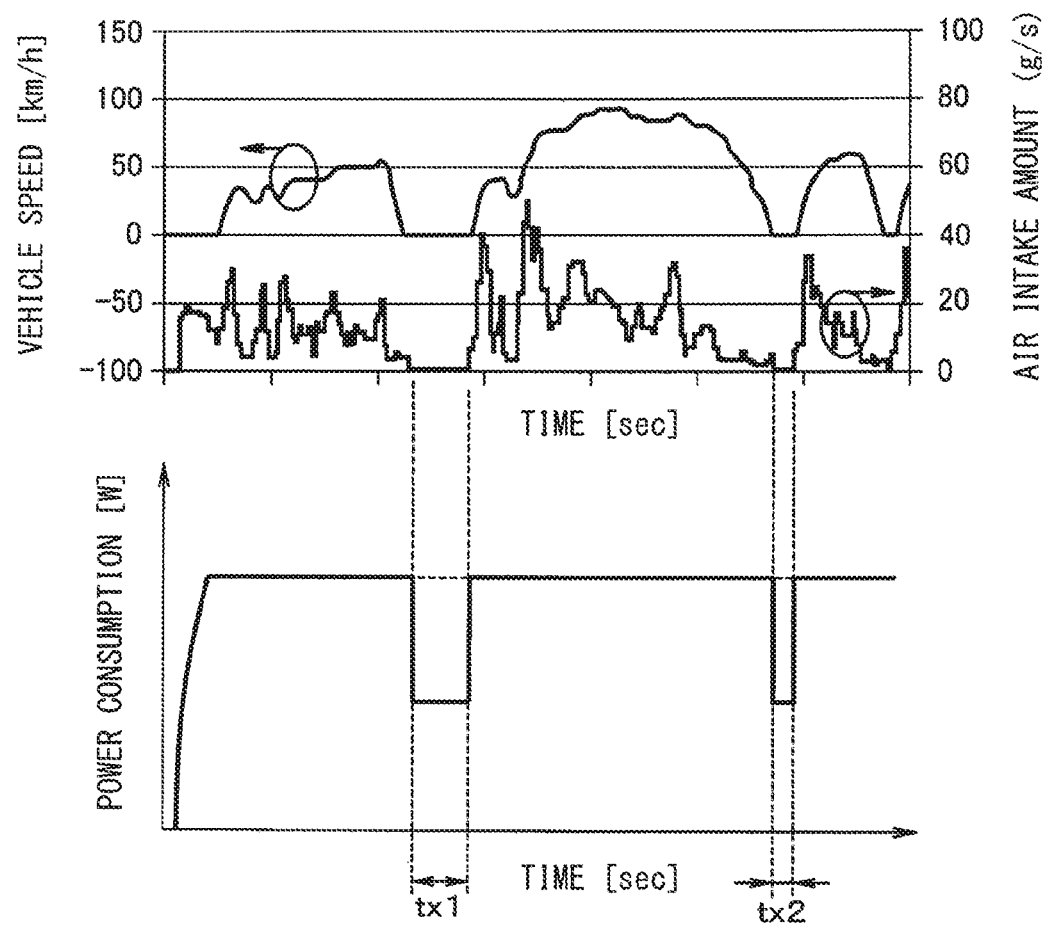
FIG. 10 is a time chart illustrating a relationship between a vehicle speed, an air intake amount, and power consumption.

FIG. 10 shows a time chart of an example relationship among a vehicle speed, an air intake amount, and a consumption of electric power in the vehicle. Times tx1 and tx2 in FIG. 10 are a period of idle-stop ON state, during which controlled temperature T of the heater 42 is lowered, and thus the power consumption lowers accordingly.

Comparisons of Modifications to the Present Embodiment

Figure 11:
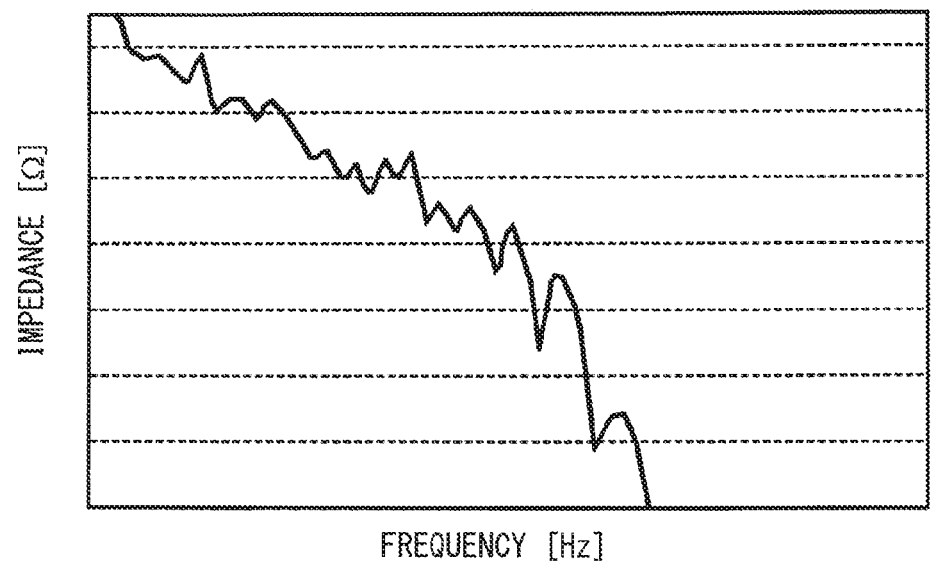
FIG. 11 illustrates characteristics of a relationship between an impedance and a frequency of an alternating application voltage.
Figure 12:
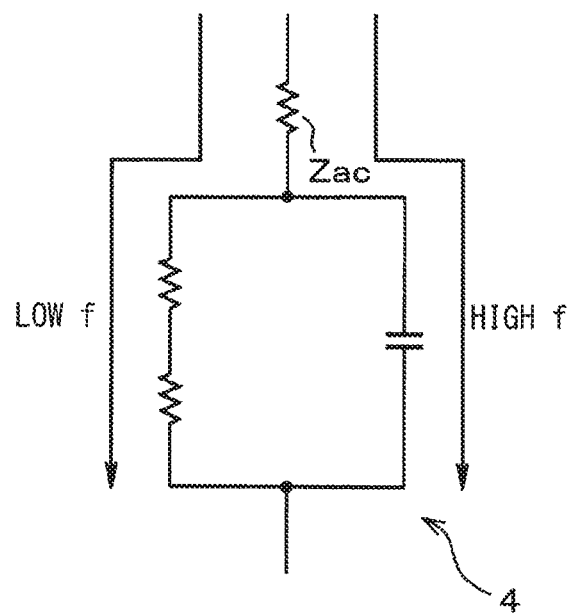
FIG. 12 illustrates an equivalent circuit of the air-fuel ratio sensor.

FIGS. 11 and 12 and their accompanying descriptions illustrate and describe experimental modifications to the present embodiment. FIG. 11 contemplates changing an application frequency of the sweep voltage ΔV. FIG. 11 shows a characteristics diagram of the impedance Zac of the air-fuel ratio sensor 4 according to the frequency of the alternating sweep voltage. FIG. 12 illustrates an electrical equivalent circuit of the air-fuel ratio sensor 4. As shown in FIGS. 11 and 12, the air-fuel ratio sensor 4 has capacitive characteristics, for example, when the frequency of the alternating voltage is raised, the impedance Zac falls, and when the frequency is lowered, the impedance Zac rises.

The electric current flows toward the capacitor when the alternating application voltage has a high frequency as shown in FIG. 12. Therefore, even though the electric current flowing to the capacitor is substantially free from the influence of various resistances such as the surface resistance of the electrode in a high frequency, resistances other than the surface resistance of the electrode still persist, which can influence the electric current as the frequency decreases.

Therefore, when the alternating sweep voltage ΔV is applied to the air-fuel ratio sensor 4 by the application voltage controller 21, even when the alternating voltage is applied at a lower frequency in order to secure the settling time mentioned above, that is, to extend a duration of the control cycle, it increases the impedance Zac of the air-fuel ratio sensor 4. Therefore, in consideration of the influence of the filters 43 and 44 described above, application of the low-frequency alternating voltage may not likely be an effective remedy or improvement. On the contrary, using a higher frequency alternating voltage leads to a higher processing load, which necessitates the use of large scale circuits, and is not also preferable.

Conceptual Conclusion of the Present Embodiment

According to the present embodiment, the electronic control unit 100 obtains a signal based on the impedance Zac of the air-fuel ratio sensor 4 in response to a power supply to the air-fuel ratio sensor 4. The electronic control unit 100 determines whether the air-fuel ratio sensor 4 is in a low-temperature environment, and the electronic control unit 100 can switch between different signals to be obtained based on whether the air-fuel ratio sensor 4 is operating in a low-temperature environment. Therefore, even when the accuracy of the obtained signal decreases under the influence of the filters 43 and 44 in the low-temperature environment, the electronic control unit 100 can accordingly switch to obtain a different signal in the low-temperature environment, so as to improve the signal accuracy.

Since the protection resistor 24 and the shunt resistor 25 are provided respectively on the upstream side and the downstream side as detection resistors with respectively different resistance values, by switching between these detection resistors 24 and 25 to obtain the inter-terminal voltage, the time constant of each of the filters 43 and 44, which changes according to the temperature, can be changed on the upstream side and the downstream side. Therefore, the signal to be obtained can be changed based on the temperature environment by switchingly obtaining the inter-terminal voltage from these detection resistors 24 and 25.

The detection resistors 24 and 25 are switched by using the switch 26 based on a value that is obtained by periodic sampling during a preset time of the control cycle of the alternating voltage, that is, at least a part of one cycle. Therefore, depending on whether the signal waveform is converging or not, the influence of the filters 43 and 44 can be accurately determined, and the switching of the detection resistors 24 and 25 can be performed at an appropriate timing.

Since the signal is obtained by switching the detection resistors 24 and 25 by the switch 26 according to the moving average calculated by the periodically sampled values, the detection resistors 24 and 25 are switchable for obtaining the signal depending on whether the filters 43 and 44 are influencing the value, thereby enabling the switching of the detection resistors at an appropriate timing.

Due to the switching of the switch 26 in the low-temperature environment, i.e., more specifically, based on the fulfillment of the S1 condition and the S8 condition in FIG. 6, for obtaining the inter-terminal voltage of the protection resistor 24 on the upstream side of the electric current when the air-fuel ratio in the exhaust gas is in the lean state, the signal is obtainable without the influence of the filter in the low-temperature environment, especially without the influence of the latter stage filter 44, and thereby the accuracy of the obtained signal can be improved.

Further, due to the switching of the switch 26 in the low-temperature environment, i.e., more specifically, based on the fulfillment of the S1 condition and the S8 condition in FIG. 6, for obtaining the inter-terminal voltage of the protection resistor 24 that has a lower resistance value than the shunt resistor 25, the signal is obtainable without the influence of the filter in the low-temperature environment, especially the influence of the latter stage filter 44, and thereby the accuracy of the obtained signal can be improved.

Due to the switching of the switch 26 based on a condition of idle-stop ON determination for obtaining the inter-terminal voltage of the protection resistor 24, the signal is obtainable without a problematic influence of the filter in a low-temperature environment, especially the influence of the latter stage filter 44, and thereby the accuracy of the obtained signal can be improved.

The electronic control unit 100 can switch to obtain the inter-terminal voltage of the protection resistor 24 based on a condition that the injection signal instructing an injection control to the injector 2 is not detected for the preset amount of time, the signal can be obtained without any problematic influence of the filter in a low-temperature environment, especially the influence of the latter stage filter 44, and thereby the accuracy of the obtained signal can be improved.

Second Embodiment

Figure 13:
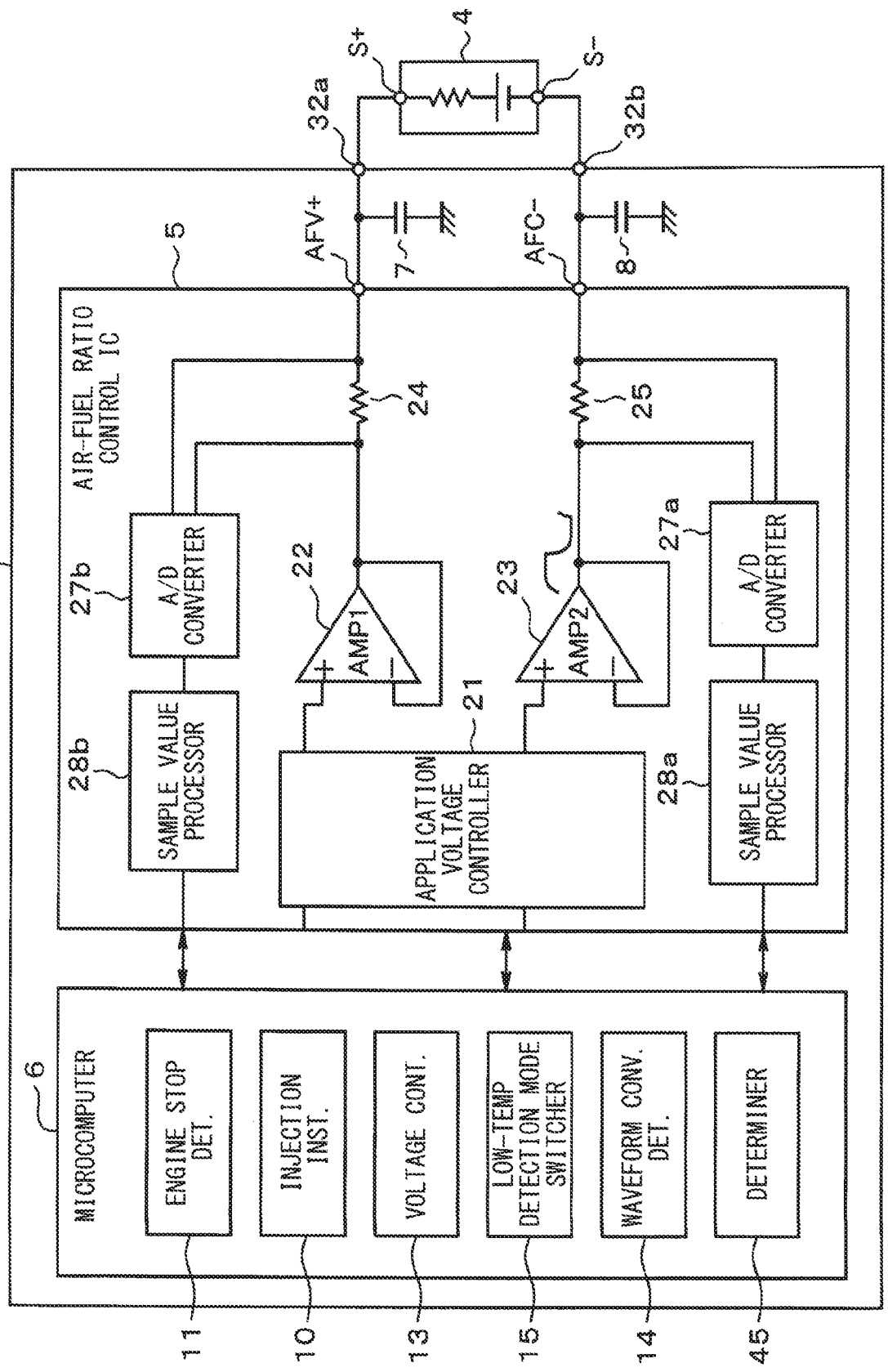
FIG. 13 is a block diagram of a microcomputer and an air-fuel ratio control IC in a second embodiment of the present disclosure.
Figure 14:
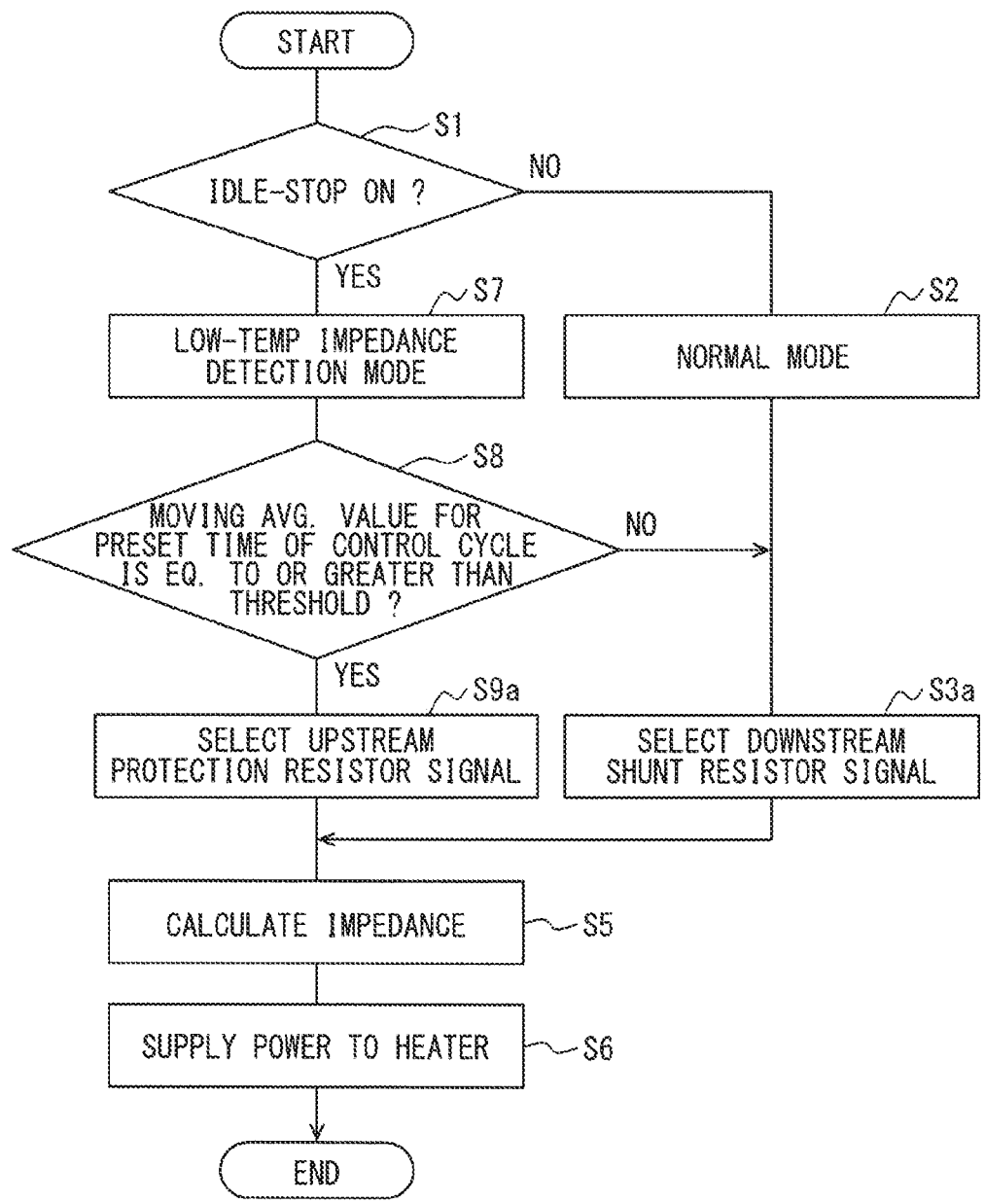
FIG. 14 is a flowchart of a control operation.

FIGS. 13 and 14 illustrate a second exemplary embodiment of the present disclosure. FIG. 13 shows an electric configuration of an electronic control unit 200, replacing the one shown in FIG. 2.

As shown in FIG. 13, the electronic control unit 200 is provided with two separate A/D converters and the sample value processors, e.g., (i) an A/D converter 27a and a sample value processor 28a detecting an electric current flowing in the shunt resistor 25 by obtaining the inter-terminal voltage of the shunt resistor 25, and (ii) an A/D converter 27b and a sample value processor 28b detecting an electric current flowing in the protection resistor 24 by obtaining the inter-terminal voltage of the protection resistor 24. These A/D converters 27a and 27b and sample value processors 28a and 28b serve as a "plurality of" signal obtainers, where each of the A/D converter and corresponding sample value processor can together be considered as a "signal obtainer."

During the operation of the vehicle and the electronic control unit 200, these A/D converters 27a and 27b and sample value processors 28a and 28b are configured to continuously obtain the voltage value corresponding to the electric current flowing in the protection resistor 24 and the shunt resistor 25 respectively, and output information regarding the voltage value to the microcomputer 6. Thereby, the microcomputer 6 can receive and obtain the sample value from the two systems in parallel, and the microcomputer 6 is enabled to select one of the sample values from the two systems according to the determination by a determiner 45.

FIG. 14 shows a flowchart illustrating a process flow that is different than the process flow in FIG. 6.

As shown in FIG. 14, when the condition of S1 is not fulfilled, i.e., "NO," the microcomputer 6 controls the low-temperature detection mode switcher 15 to switch to the normal mode in S2, selects the signal from the downstream side shunt resistor 25 in S3a, calculates the impedance Zac in S5 according to the obtained value from the A/D converter 27a and the sample value processor 28a, and performs a power supply control to the heater 42 in S6.

Conversely, when the condition of S1 is fulfilled, i.e., "YES," the microcomputer 6 controls the low-temperature detection mode switcher 15 to switch to the low-temperature impedance detection mode in S7, and, when the condition in S8 is fulfilled, selects the signal from the upstream side protection resistor 24 in S9a. Then, the microcomputer 6 calculates the impedance Zac in S5 according to the obtained value from the A/D converter 27b and the sample value processor 28b, and performs a power supply control to the heater 42 in S6.

Thus, the second embodiment can also achieve the same operational effects as those described in the first embodiment.

Conceptual Summary of the Present Embodiment

In the present embodiment, since the continuously-obtained inter-terminal voltages of the protection resistor 24 and the shunt resistor 25 are selectively switchable by the microcomputer 6, the same operation effects as the first embodiment are achievable. Further, the switch 26 used in the first embodiment is omissible in the second embodiment, thereby preventing an error caused by a leak current of the switch 26. Thus, compared with the above-described first embodiment, the second embodiment can further improve the accuracy of the obtained signal.

The detection resistor 25 and the protection resistor 24 disposed on the upstream side and on the downstream side with respectively-different resistance values are selectively switched for obtaining the inter-terminal voltage of the detection resistor or the protection resistor, which enables the switching of the obtained signal according to the temperature environment.

Third Embodiment

Figure 15:
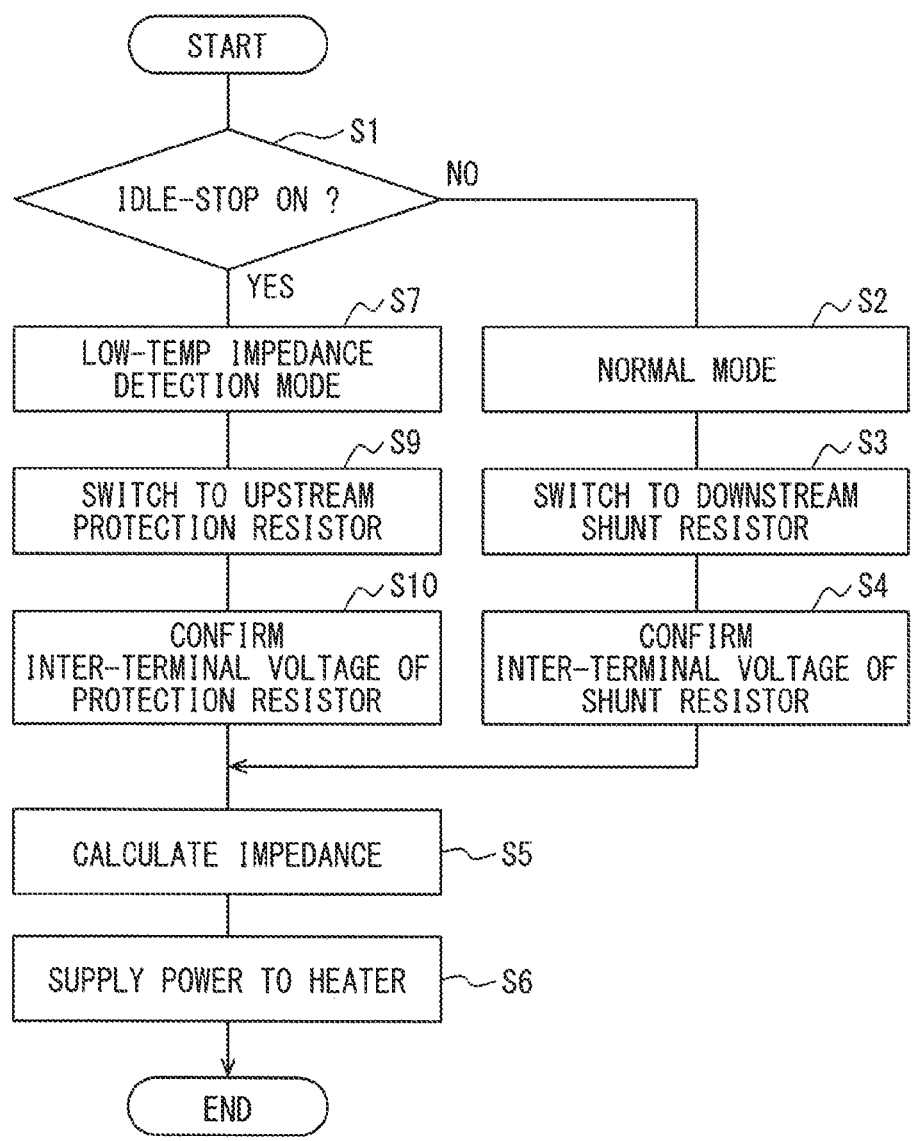
FIG. 15 is a flowchart of a control operation in a third embodiment of the present disclosure.

FIG. 15 illustrates a third embodiment of the present disclosure with process flows that may be used in place of the process flows shown in FIG. 6. As shown in FIG. 15, when the condition of S1 is fulfilled, the switch 26 may be switched in S9 "unconditionally" for obtaining the inter-terminal voltage from the protection resistor 24.

That is, the voltage condition determination in S8 of FIG. 6 may be omitted, and, in instances where the operation of the air-fuel ratio sensor 4 in a low-temperature environment is foreseen, switching from the inter-terminal voltage of the shunt resistor 25 to the inter-terminal voltage of the protection resistor 24 may be made in advance to switch between the two voltages.

For example, in the first embodiment, in a control cycle in which a determination process of the moving average of Step S8 of FIG. 6 is performed, the impedance Zac may not be calculable with a high accuracy. However, in the present embodiment, since the switch 26 is configured to be immediately switched when the condition of S1 is fulfilled, the waveform quickly converges by such switching, and thereby the impedance Zac becomes immediately calculable with a high accuracy.

Other Embodiments

The present disclosure is not limited to the embodiments described above, and may be modified for providing other embodiments. For example, the following modifications/expansions may be made.

In S8, the determination is made based on the moving average in a preset period. However, the present disclosure is not limited to such a determination scheme. That is, the determination in S8 may be made based on the sample value itself or based on a slope of the consecutive sample values.

An amplifier circuit for amplifying the electric current detected by the detection resistors 24 and 25 may be used, which is not shown in FIG. 2. The amplifier circuit may be disposed respectively at two positions between the switch 26 and the resistors 24, 25, or at a position between the switch 26 and the A/D converter 27.

The "filter" provided as an equivalent circuit of the secondary RC low-pass filter in the above embodiments, may also be provided as one equivalent to a band-pass filter or other filtering circuits.

For example, in the first and third embodiments, the configuration for obtaining the inter-terminal voltage is described as switching between the inter-terminal voltage of the protection resistor 24 on the upstream side and the inter-terminal voltage of the shunt resistor 25 on the downstream side. However, if a certain node is configurable to provide a signal voltage or a signal electric current that is especially resistant to the influence of the latter stage filter 44, even when the impedance Zac of the air-fuel ratio sensor 4 rises to a high value, the signal may be obtained from such a node. That is, the "signal" obtained by the signal obtainer, described above as the electric current flowing in the detection resistors 24, 25 and obtained to determine the inter-terminal voltages of the detection resistors 24, 25, may be detected and/or obtained as other inter-terminal voltages or electric currents flowing to other terminals.

The air-fuel ratio sensor 4 of a one-cell type described above may also be a two-cell type sensor 4.

In the first to third embodiments, the transition to the low-temperature impedance detection mode is described as being based on a condition that an idle-stop ON state is set in S1 of FIG. 6, FIG. 14, and FIG. 15. However, the idle-stop ON state in S1 may be replaced with a fuel-cut ON state. The fuel-cut ON state is set to cut fuel when a preset condition is fulfilled, e.g., when an engine rotation number is close to an idle rotation and is equal to or greater than a preset number, water temperature is equal to or above a certain threshold, an accelerator is being turned OFF, and like conditions. When the fuel-cut ON state is detected to cut fuel, it may also be detected as a condition to transition to the low-temperature impedance detection mode (i.e., S7 in FIG. 6, 14, or 15), to perform a control of Steps S8-S10, S5, and S6 of FIG. 6; or Steps S8, S9a, S5, and S6 of FIG. 14; or Steps S9, S10, S5, and S6 of FIG. 15.

Further, for example, a temperature sensor or the like for measuring temperature T of the air-fuel ratio sensor 4 may be disposed on or near the air-fuel ratio sensor 4, and a current or prospective low temperature determination may be made based on the detection result of the temperature sensor. That is, for example, instead of the condition of S1, the temperature detection result of the temperature sensor indicating a lower-than-preset value may be used as a condition to transition to the low-temperature impedance detection mode, and the same control as described above may be performed thereafter.

Further, the condition of S1 in the first to third embodiments may be determined as branching to YES when an opening degree sensor of an electronic throttle indicates that a detected opening degree of the electronic throttle is a full close. That is, in case that the driver of the vehicle depresses an accelerator pedal and a brake pedal simultaneously, according to a brake override system/program, the opening degree of the electronic throttle is set as a full close. Based on such a condition of a full close, the low-temperature impedance detection mode may be set (e.g., S7 in FIG. 6, 14, or 15), and the same control as described above may be performed thereafter.

The condition of S1 in the first to third embodiments may further be modified to, for example, a condition of an air intake amount detected by an air-intake sensor as being lower than a preset amount, to transition to the low-temperature impedance detection mode (e.g., S7 in FIG. 6, 14, or 15) and the same control as described above may be performed thereafter.

The condition of S1 in the first to third embodiments may further be modified to, for example, a condition of speed information on a vehicle speed detected by a speed sensor as being lower than a preset value, to transition to the low-temperature impedance detection mode (e.g., S7 in FIG. 6, 14, or 15) and the same control as described above may be performed thereafter.

The condition of S1 in the first to third embodiments may further be modified to, for example, a condition of information on a shift-lever position detected as being in a parking position (P) or the like, to transition to the low-temperature impedance detection mode (e.g., S7 in FIG. 6, 14, or 15) and the same control as described above may be performed thereafter.

The condition of the idle-stop ON state or the fuel-cut ON state may be determined according to the sensor signal Se based on singular information or a combination of a plurality of information among the above-described information, to transition to the low-temperature impedance detection mode, and the same control as described above may be performed thereafter.

The above-described embodiments may be combined, either in part, or as a whole. For example, elements and features of the first embodiment may be combined with a portion (e.g., some of) the elements and features of the second embodiment.

Although the present disclosure has been fully described in connection with embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. An electronic control unit for controlling an air-fuel ratio sensor that detects an air-fuel ratio of an exhaust gas from an internal-combustion engine, the electronic control unit comprising:
a signal obtainer configured to obtain a signal according to an impedance of the air-fuel ratio sensor in response to a power supply to the air-fuel ratio sensor via a filter;
a microcomputer configured to determine an environment temperature of the air-fuel ratio sensor based on the obtained signal;

a switcher configured to switch the signal obtained by the signal obtainer when the microcomputer determines that the environment temperature of the air-fuel ratio sensor is a low-temperature environment;
an upstream side power supply path to the air-fuel ratio sensor having a first detection resistor; and
a downstream side power supply path to the air-fuel ratio sensor having a second detection resistor, wherein
a resistance value of the first detection resistor is different than a resistance value of the second detection resistor, and wherein
the switcher is provided as a switch configured to switch between the first detection resistor to obtain a first inter-terminal voltage and the second detection resistor to obtain a second inter-terminal voltage, and wherein
the signal obtainer is further configured to obtain the first inter-terminal voltage and the second inter-terminal from the switch.

2. The electronic control unit of claim 1, wherein
the signal obtainer is further configured to obtain the signal in response to a supply of an alternating voltage to the air-fuel ratio sensor, and
the switcher is further configured to switch the signal obtained by the signal obtainer based on cyclically sampled values from at least a part of one cycle of the alternating voltage.

3. The electronic control unit of claim 2, wherein
the switcher is further configured to switch the signal obtained by the signal obtainer according to a moving average calculated based on the cyclically sampled values.

4. The electronic control unit of claim 1, further comprising
a plurality of the signal obtainers configured to continuously obtain a plurality of signals respectively corresponding to various impedances of the air-fuel ratio sensor, and wherein
the switcher is configured to selectively switch the plurality of signals continuously obtained by the plurality of the signal obtainers.

5. The electronic control unit of claim 4, wherein
a power supply path to the air-fuel ratio sensor has two detection resistors having respectively different resistance values, with a first detection resistor disposed on an upstream side of the power supply path and a second detection resistor disposed on a downstream side of the power supply path, and
the plurality of the signal obtainers are respectively further configured to obtain an inter-terminal voltage value of the first detection resistor and the second detection resistor, and wherein
the switcher is further configured to select a value of the inter-terminal voltage from among the inter-terminal voltage values obtained by the plurality of the signal obtainers.

6. The electronic control unit of claim 1, wherein
the filter is a secondary RC low-pass filter including the air-fuel ratio sensor.

7. The electronic control unit of claim 1, wherein
a power supply path to the air-fuel ratio sensor has two detection resistors having respectively different resistance values, with a first detection resistor disposed on an upstream side of the power supply path and a second detection resistor disposed on a downstream side of the power supply path, and wherein
the switcher is further configured to switch to obtain an inter-terminal voltage of the first detection resistor from an electric current that is caused to flow as a result of a lean air-fuel ratio of the exhaust gas when the microcomputer determines that the air-fuel ratio sensor is in the low-temperature environment.

8. The electronic control unit of claim 1, wherein the switcher is further configured to switch to obtain the inter-terminal voltage of the first detection resistor and the second detection resistor having a smaller resistance value when the microcomputer determines that the air-fuel ratio sensor is in the low-temperature environment.

9. The electronic control unit of claim 1, wherein
the switcher is further configured to switch the signal obtained by the signal obtainer based on a condition that an injection signal for instructing an injection control integrated IC to inject fuel from an injector used in the engine is not detected for a preset amount of time.

10. The electronic control unit of claim 1, wherein
the switcher is further configured to switch the signal obtained by the signal obtainer based on a determination of a condition of the engine that (i) an idle-stop ON state is in effect or (ii) a fuel-cut ON state is in effect.

11. An electronic control unit comprising:
a microcomputer including: an injection instructor, an engine stop determiner, a switch controller, a voltage controller, a waveform convergence detector, and a low temperature detection mode switcher;
an air-ratio control integrated circuit including:
a detection circuit switch instructor,
an application voltage controller,
a protection buffer amplifier,
a protection resistor,
an upstream side terminal,
a shunt buffer amplifier,
a shunt resistor,
a downstream side terminal,
a switcher including: a pair of protection fixed terminals connected to respectively to opposite ends of the protection resistor, a pair of shunt fixed terminals connected respectively to opposite ends of the shunt resistor, and a pair of movable terminals, wherein the pair of movable terminals is configured to contact one pair selected from: the pair of protection fixed terminals, and the pair of shunt fixed terminals,
an analog/digital converter, and
a sample value processor, wherein the analog/digital converter and the sample value processor combine to form a signal obtainer;
a first capacitor connecting the upstream side terminal to a ground; and
a second capacitor connecting the downstream side terminal to ground,
wherein the upstream side terminal and the downstream side terminal are configured for connection to an air-fuel ratio sensor, and
wherein the electronic control unit is configured to control the air-fuel ratio sensor.

* * * * *